United States Patent
Kim et al.

(10) Patent No.: US 8,535,843 B2
(45) Date of Patent: Sep. 17, 2013

(54) FUEL CELL BIPOLAR PLATE FOR PREVENTING FLOODING

(75) Inventors: Soo Whan Kim, State College, PA (US); Jong Jin Yoon, Seoul (KR); Kyu Taek Cho, Gyeonggi-do (KR); Byung Ki Ahn, Gyeonggi-do (KR); Jong Hyun Lee, Gyeonggi-do (KR); Matthew M. Mench, State College, PA (US)

(73) Assignees: Hyundai Motor Company, Seoul (KR); The Penn State Research Foundation, University Park, PA (US)

( * ) Notice: Subject to any disclaimer, the term of this patent is extended or adjusted under 35 U.S.C. 154(b) by 782 days.

(21) Appl. No.: 12/328,846

(22) Filed: Dec. 5, 2008

(65) Prior Publication Data

US 2010/0143758 A1    Jun. 10, 2010

(51) Int. Cl.
*H01M 2/38* (2006.01)
*H01M 8/24* (2006.01)

(52) U.S. Cl.
USPC ............ 429/457; 429/514; 429/518; 429/439

(58) Field of Classification Search
None
See application file for complete search history.

(56) References Cited

U.S. PATENT DOCUMENTS

| 3,940,285 | A  | * | 2/1976  | Nickols et al. ................ 429/434 |
|---|---|---|---|---|
| 4,276,355 | A  | * | 6/1981  | Kothmann et al. ........... 429/435 |
| 4,508,793 | A  | * | 4/1985  | Kumata et al. ................ 429/439 |
| 5,853,909 | A  | * | 12/1998 | Reiser ........................... 429/437 |
| 6,037,073 | A  | * | 3/2000  | Besmann et al. ............. 429/434 |
| 6,127,057 | A  |   | 10/2000 | Gorman |
| 6,974,648 | B2 | * | 12/2005 | Goebel .......................... 429/434 |
| 2003/0165731 | A1 | * | 9/2003 | Vyas et al. ...................... 429/44 |
| 2006/0024561 | A1 | * | 2/2006 | Sato et al. ....................... 429/38 |
| 2007/0072031 | A1 |   | 3/2007 | Darling et al. |

FOREIGN PATENT DOCUMENTS

| JP | 2006-134698 | 5/2006 |
|---|---|---|
| JP | 2006-302697 | 11/2006 |

* cited by examiner

*Primary Examiner* — Cynthia Walls
(74) *Attorney, Agent, or Firm* — Edwards Wildman Palmer LLP; Peter F. Corless

(57) ABSTRACT

The present invention provides a fuel cell bipolar plate in which an air gap or a material layer having a heat transfer coefficient lower than that of the bipolar plate is provided so as to reduce total amount of liquid water generated in a fuel cell, thereby preventing the occurrence of flooding and reducing the time required for cold start, enhancing durability, decreasing parasitic purge requirements, and enhancing operational stability.

1 Claim, 4 Drawing Sheets

FUEL CELL BIPOLAR PLATE FOR PREVENTING FLOODING

BACKGROUND (a) Technical Field

The present invention relates to a fuel cell bipolar plate, which prevents water accumulation by locally increasing heat transfer resistance and temperature with the use of a layer or subsection having a low thermal conductivity, thus preventing the occurrence of flooding.

(b) Background Art

Catalyst or diffusion media flooding (hereinafter referred to as "flooding") of a fuel cell occurs as liquid water is accumulated at the bottom of land portions 12a of a bipolar plate 100 or along the wall surface of a gas flow field during operation of the fuel cell as shown in FIG. 1. Such flooding makes it difficult for hydrogen and air to reach the catalyst layer, thus reducing the performance of the fuel cell during operation in a normal state. Flooding can also be responsible for performance instability and hasten deterioration of component life, reducing durability.

In a structure in which the flooding is more likely to occur, the amount of water remaining in the fuel cell during shut-down of the fuel cell is relatively larger than a structure in which the flooding is less likely to occur. When the fuel cell is kept at sub zero temperatures, the amount of generated ice is increased with the increase in the amount of remaining liquid water, which deteriorates the durability of the fuel cell and requires more energy and time to restart the fuel cell.

Accordingly, it is necessary to minimize the amount of liquid water so as to improve the durability of the fuel cell.

In order to prevent the flooding in the fuel cell, the temperature of an outlet port of an air flow field of the bipolar plate, where the amount of water is relatively larger, can be designed to be maintained at a relatively high temperature.

In some cases where the coolant temperature is relatively low, flooding is most likely to occur. Because of the mismatch between the heat transfer through the channel gas, which is low, and the bipolar plate, which is high, flooding is most likely occur under the land portions. Accordingly, there are difficulties in preventing the occurrence of flooding merely using temperature distribution of the inlet and output ports due to the variation in heat transfer characteristics between the channel and land locations.

Moreover, during operation, a transient flow increase is performed periodically or when the performance of the fuel cell is deteriorated to remove the liquid water present on the flow field. Furthermore, purging is performed to reduce the amount of water during shut-down. These operations are parasitic and reduce efficiency, but are needed to reduce liquid water accumulation detrimental to performance, stability, and durability.

However, in the case where the material having the same heat transfer characteristic as the bipolar plate is used in designing the coolant flow field of the bipolar plate, it is difficult to locally control the temperature distribution of the bipolar plate, and thus there are difficulties in preventing the occurrence of flooding. Moreover, it is difficult to remove the liquid water accumulated under the land portions by the purging operation.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

One object of the present invention is to provide a fuel cell bipolar plate for preventing flooding, in which an air gap or a material layer having a heat transfer coefficient lower than that of the bipolar plate is used in designing a coolant flow field of the bipolar plate so as to locally increase the temperature of an area where liquid water is easily stored and flooding occurs, thus reducing the total amount of liquid water stored in a fuel cell, preventing the occurrence of flooding to improve the performance of the fuel cell in a normal state and in a transient state, and reducing the time and energy required for cold start.

In one aspect, the present invention provides a fuel cell bipolar plate for preventing flooding, the bipolar plate comprising: a first plate member including a hydrogen flow field formed on a portion of the top surface thereof and a coolant flow field formed on a portion of the bottom surface thereof; and a second plate member including a coolant flow field formed on a portion of the top surface thereof, at least one material layer having a thermal conductivity lower than that of the bipolar plate on another portion or portions of the top surface thereof, and an air flow field formed on a portion of the bottom surface thereof. The first plate member and the second plate member are bonded to each other such that the hydrogen flow field is positioned on a portion of the top surface of the bipolar plate and the air flow field is positioned on a portion of the bottom surface of the bipolar plate with the coolant flow field positioned at a position between the hydrogen flow field and the air flow field.

In another aspect, the present invention provides a bipolar plate comprising: a first plate member including a hydrogen flow field formed on a portion of the top surface thereof, a coolant flow field formed on a portion of the bottom surface thereof, and at least one material layer having a thermal conductivity lower than that of the bipolar plate on another portion or portions of the bottom surface thereof; and a second plate member including a coolant flow field formed on a portion of the top surface thereof and an air flow field formed on a portion of the bottom surface thereof. The first plate member and the second plate member are bonded to each other such that the hydrogen flow field is positioned on a portion of the top surface of the bipolar plate and the air flow field is positioned on a portion of the bottom surface of the bipolar plate with the coolant flow field positioned at a position between the hydrogen flow field and the air flow field.

In still another aspect, the present invention provides a bipolar plate comprising: a first plate member including a hydrogen flow field formed on a portion of the top surface thereof, a coolant flow field formed on a portion of the bottom surface thereof and at least one material layer having a thermal conductivity lower than that of the bipolar plate on another portion or portions of the bottom surface thereof; and a second plate member including a coolant flow field formed on a portion of the top surface thereof, at least one material layer having a thermal conductivity lower than that of the bipolar plate on another portion or portions of the top surface thereof, and an air flow field formed on a portion of the bottom surface thereof. The first plate member and the second plate member are bonded to each other such that the hydrogen flow field is positioned on a portion of the top surface of the bipolar plate and the air flow field is positioned on a portion of the bottom surface of the bipolar plate with the coolant flow field positioned at a position between the hydrogen flow field and the air flow field.

In the bipolar plates, the material layer or layers may be formed at a position below a land portion of the first plate member and/or above a land portion of the second plate member such that the amount of accumulated water of at least one of the land portions is reduced by increasing the temperature of at least one of the land portions.

Suitably, at least one of the material layers is an air gap, or a portion of low thermal conductivity material.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
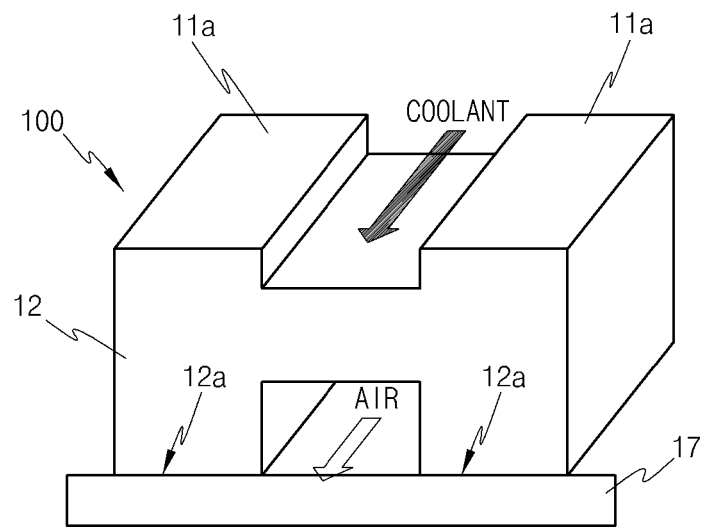
FIG. 1 is a conceptual diagram showing a structure of a conventional fuel cell bipolar plate.

Reference numerals set forth in the Drawings includes reference to the following elements as further discussed below:

| | |
|---|---|
| 10: bipolar plate | 11: first plate member |
| 12: second plate member | 11a, 12a: land portion |
| 11b, 12b: channel portion | 13: hydrogen flow field |
| 14: air flow field | 15: coolant flow field |
| 16: air gap | 17: gas diffusion layer |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
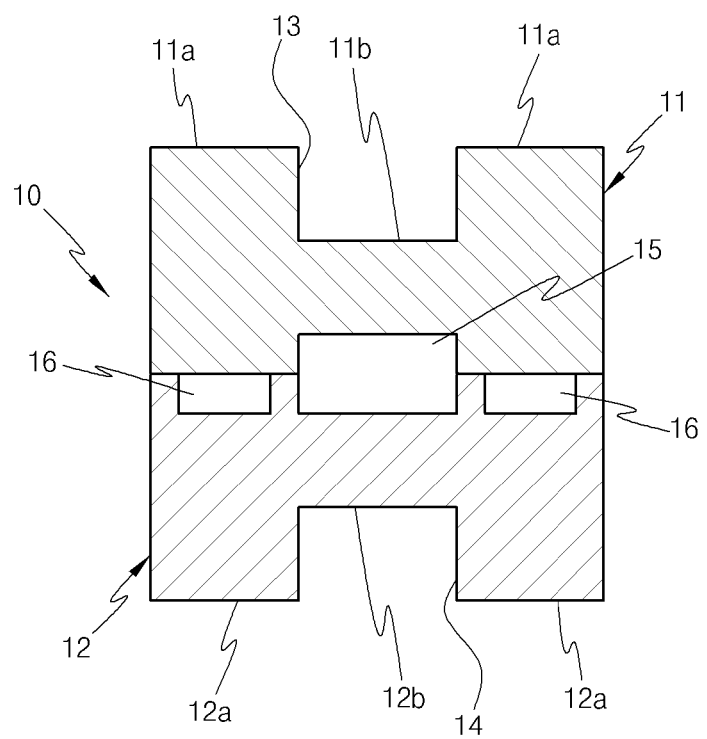
FIG. 2 is a cross-sectional view showing a fuel cell bipolar plate for preventing flooding in accordance with a preferred embodiment of the present invention.
Figure 3:
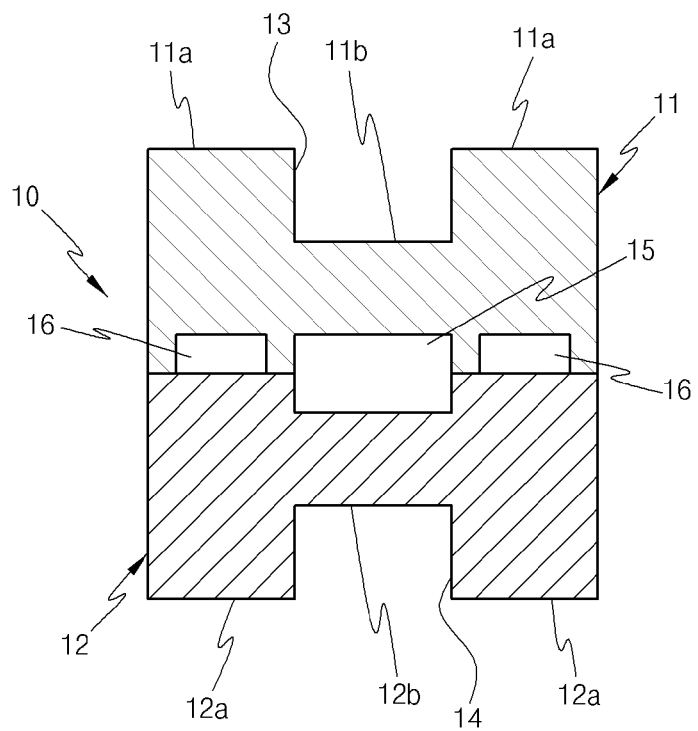
FIG. 3 is a cross-sectional view showing a fuel cell bipolar plate for preventing flooding in accordance with another embodiment of the present invention.
Figure 4:
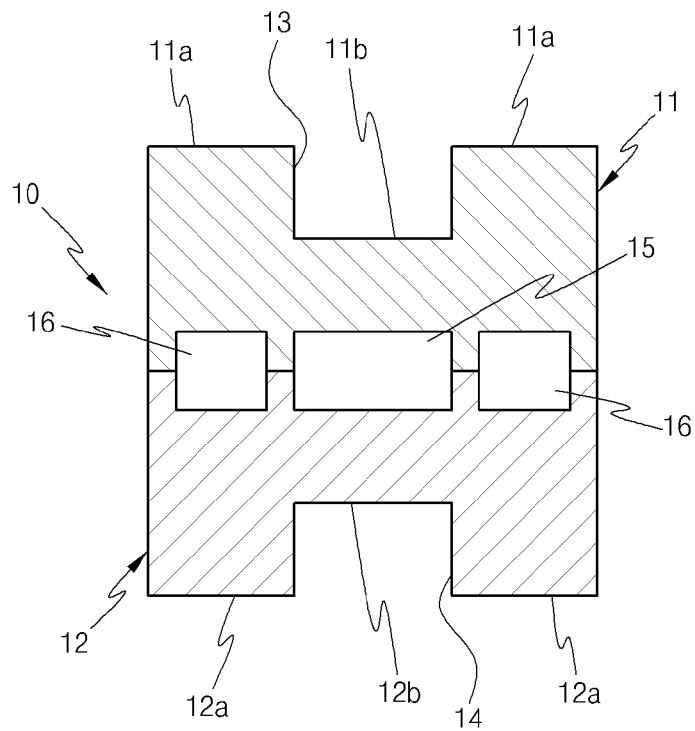
FIG. 4 is a cross-sectional view showing a fuel cell bipolar plate for preventing flooding in accordance with a still another embodiment of the present invention.
Figure 5:
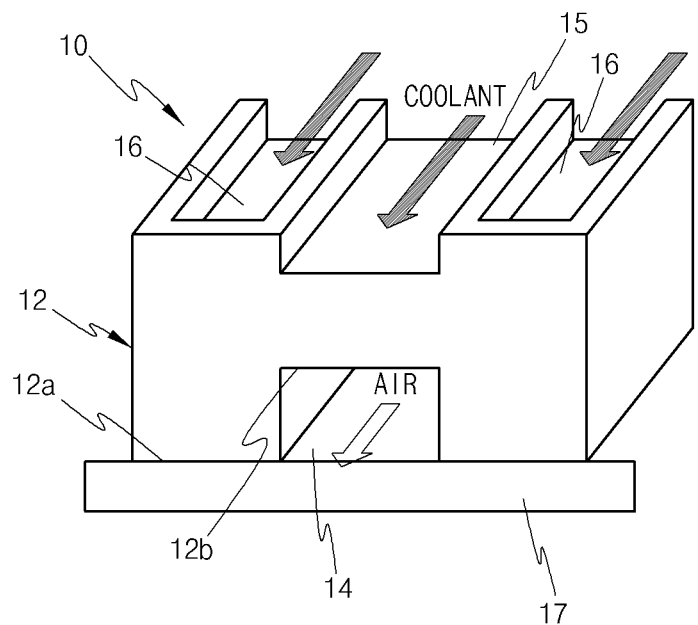
FIG. 5 is a configuration diagram showing a fuel cell bipolar plate at an air electrode side in accordance with the present invention.
Figure 6:
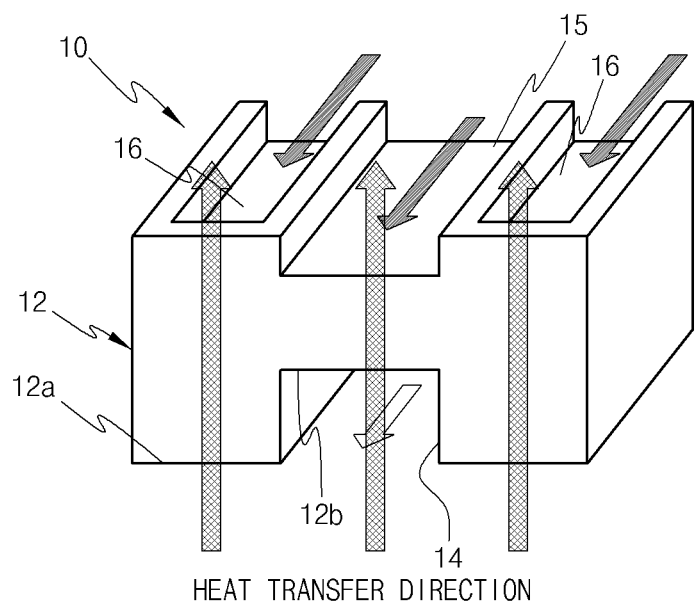
FIG. 6 is a state diagram showing a heat transfer direction of the bipolar plate in FIG. 5.
Figure 7:
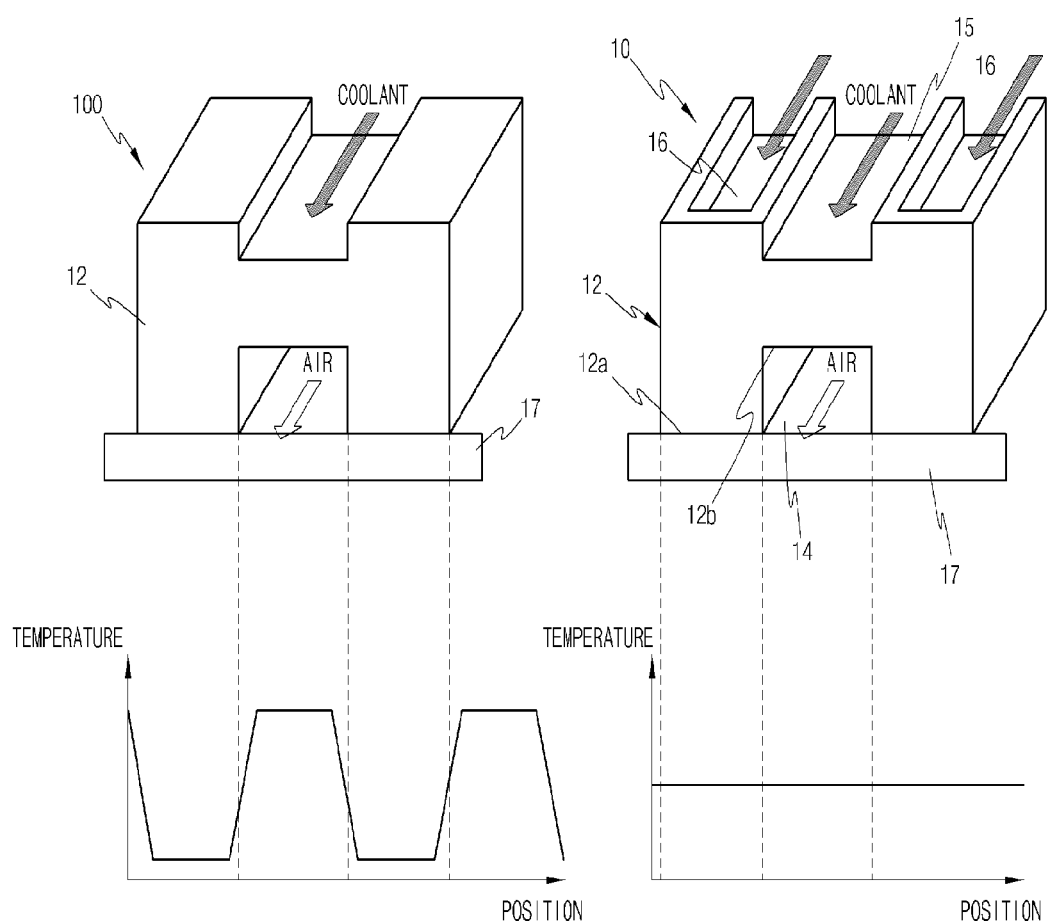
FIG. 7 is a diagram comparing the temperature distribution of a fuel cell bipolar plate in accordance with the present invention with that of a conventional fuel cell bipolar plate.

FIG. 2 is a cross-sectional view showing a fuel cell bipolar plate for preventing flooding in accordance with a preferred embodiment of the present invention, FIG. 3 is a cross-sectional view showing a fuel cell bipolar plate for preventing flooding in accordance with another embodiment of the present invention, FIG. 4 is a cross-sectional view showing a fuel cell bipolar plate for preventing flooding in accordance with a still another embodiment of the present invention, FIG. 5 is a configuration diagram showing a fuel cell bipolar plate at an air electrode side in accordance with the present invention, FIG. 6 is a state diagram showing a heat transfer direction of the bipolar plate in FIG. 5, and FIG. 7 is a diagram comparing the temperature distribution of the fuel cell bipolar plate in accordance with the present invention with that of a conventional fuel cell bipolar plate.

A fuel cell stack is formed by stacking a plurality of unit cells comprising a bipolar plate 10, a gas diffusion layer 17, a membrane electrode assembly (MEA), another gas diffusion layer 17, and another bipolar plate 10 in the order.

The bipolar plate 10 is formed in such a manner that flow fields through which reactant gases such as hydrogen and oxygen or a coolant can pass are formed by mechanical processing, molding process, and the like on either or both sides of each of two thin plate members 11 and 12 formed of graphite (or metal) and the two plate members 11 and 12 are then bonded to each other.

The thus formed fuel cell bipolar plate 10 includes an air flow field 14 and a hydrogen flow field 13 formed on both sides thereof. It also includes a coolant flow field 15 formed in a middle portion thereof to remove heat generated as a by-product of an electrochemical reaction.

Both sides of the bipolar plate 10 include land portions 11a and 12a formed to protrude toward the gas diffusion layer 17 and channel portions 11b and 12b formed concavely in the opposite direction to the gas diffusion layer 17. The air flow field 14 and the hydrogen flow field 13 are formed by the channel portions 11b and 12b and the gas diffusion layer 17, and the coolant flow field 15 is formed as a space at a position between the channel portions 11b and 12b in the vertical-up direction.

The bipolar plate 10 transfers heat generated from the MEA to be cooled by coolant supplied through the coolant flow field 15. At this time, there may be a difference in the amount of heat transfer between the land portions 11a and 12a and the channel portions 11b and 12b due to differences in their heat transfer medium of gas or solid phases. That is, since the land portions 11a and 12a have an amount of heat transfer larger than that of the channel portions 11b and 12b, the temperature of the land portions 11a and 12b can be reduced. Accordingly, water can be accumulated at the bottom of the land portions 11a and 12a due to the temperature difference between the land portions 11a and 12a and the channel portions 11b and 12b, and thus the flooding is likely to occur.

According to the present invention, an air gap 16 or a layer of a material having a low heat transfer coefficient is formed on a cooling plate of the fuel cell bipolar plate 10 separately from the coolant flow field 15 so as to reduce the amount of generated water by increasing the temperature of the area where the flooding is likely to occur and the temperature of the land portions 11a and 12a.

That is, the fuel cell is mainly cooled by the coolant, and the temperature is locally kept high by the air gap 16 or the material layer having a low heat transfer coefficient, thus preventing the occurrence of flooding.

Moreover, the air gap 16 or the material layer having a low heat transfer coefficient reduces the heat transfer in the vertical direction so as to selectively reduce the heat transfer of a desired area of the bipolar plate 10. Accordingly, it is possible to locally increase the temperature and reduce the water content by locally accumulating heat.

The air gap 16 or the material layer having a low heat transfer coefficient should be provided at a position corresponding to an air electrode or a hydrogen electrode where the flooding is likely to occur during operation of the fuel cell. In general, such a position may correspond to an area opposite to the air flow field 14 where excess water is likely to be present.

Moreover, since excess water may be present in other areas due to limitations in the design or materials, the present invention can be applied to such areas to locally prevent liquid water accumulation.

The air gap 16 or the material layer having a low heat transfer coefficient can maintain a low thermal conductivity without the use of a coolant. Accordingly, the temperature at the bottom of the air gap 16 is increased by locally increasing heat transfer resistance, thus preventing the occurrence of flooding without the use of a separate energy source.

According to an embodiment, the air gap 16 or the material layer may be positioned on a portion or portions of the bottom surface of the first plate member 11 as shown in FIG. 2. According to another embodiment, the air gap 16 or the material layer may be positioned on a portion or portions of the top surface of the second plate member 12 as shown in FIG. 3. According to still another embodiment, the air gap 16 or the material layer may be positioned on a portion or portions of both the top surface of the second plate member 12 and the bottom surface of the first plate member 11 as shown in FIG. 4. Suitably, the air gap 16 or the material layer may be formed on the vertical upper portion of the land portions 11a and 12a where the liquid water is likely to be accumulated, while not being in communication with the coolant flow field 15 and not preventing current collection.

The operation of the fuel cell bipolar plates 10 in accordance with the preferred embodiments of the present invention will be described below.

As discussed above, heat generated from the MEA by the electrochemical reaction is transferred in a vertical-up direction and heat-exchanged with a coolant, thus cooling the fuel cell stack.

In the case where the bipolar plate is formed of a material having the same heat transfer characteristic like the conventional bipolar plate 100, since the amount of heat transfer in the vertical direction is increased in the land portions 11a and 12a due to the differences in the heat transfer medium of the land portions 11a and 12a and the channel portions 11b and 12b, the temperature of the land portions 11a and 12a is relatively lower than that of the channel portions 11b and 12b. As a result, the liquid water is accumulated at the bottom of the land portions 11a and 12a, thus causing the flooding.

However, according to the present invention, the air gap 16 or the material layer is provided at a position between the land portions 11a and 12a such that the amount of heat transfer in the vertical direction is reduced in the land portions 11a and 12a. As a result, the temperature of the land portions 11a and 12a is increased to be equal to that of the channel portions 11b and 12b, and the amount of generated liquid water is reduced, thus preventing the occurrence of flooding.

Accordingly, the temperature of the bipolar plate 10 is locally increased, and thus it is possible to reduce the amount of water generated at the bottom of the air gap 16 or the material layer having a low thermal conductivity. Preferably, the air gap 16 or the material layer having a low thermal conductivity may be applied to an area where the flooding may frequently occur on the gas flow field at the hydrogen electrode or at the air electrode during operation or to a surface corresponding to the land portion 12a at the air electrode where excess water may be produced. Moreover, the present bipolar plate may be applied to any other area where excess water may be present according to the position and design of the bipolar plate 10, thus preventing water from being accumulated.

The air gap 16 or the material layer having a low thermal conductivity shows a thermal conductivity lower than that of the bipolar plate 10 without the use of a coolant, and, as a result, the local heat transfer resistance is increased and the local temperature of the air gap 16 or the material layer having a low thermal conductivity is increased, thus preventing the occurrence of flooding.

Moreover, since the air gap 16 or the material layer having a low thermal conductivity can reduce the thermal mass of the cooling plate and rapidly increase the temperature of the land portion 12a at the air electrode during cold start, it is possible to rapidly start the fuel cell at sub zero temperatures.

As described above, the fuel cell bipolar plate has the advantages including the following. It is possible to uniformly control the temperature of the bipolar plate and prevent the accumulation of liquid water and the occurrence of flooding. It also is possible to provide a high response in accordance with the system load during operation at room temperature. Since the flow of a gaseous material having high reactivity and high system stability compared with the conventional liquid water accumulation is ensured, it is possible to provide stability of the system and precise control. In addition, it is possible to reduce the purge energy required during system shut-down and ensure a good cold start-ability by reducing the thermal mass of the cooling plate. Additionally, it is possible to increase the power per weight of the fuel cell and improve the performance of the fuel cell. Further, it is possible to prevent the fuel exhaustion of the hydrogen electrode, which occurs during start-up or normal operation, thus preventing the occurrence of deterioration due to carbon corrosion in the catalyst layer. Moreover, it is possible to reduce the time required for cold start at low temperatures or at sub zero temperatures by reducing residual water and thermal mass. Lastly, it is possible to eliminate the non-uniformity of gas flow on the flow field by reducing the amount of liquid water on the gas flow field, and reduce voltage reversal and performance deterioration during normal operation or during transient load operation of the fuel cell by reducing the pressure drop.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell bipolar plate for preventing flooding, the bipolar plate comprising:
    a first plate member; and
    a second plate member bonded to the first plate member such that a hydrogen flow field is positioned on a portion of a top surface of the bipolar plate and an air flow field is positioned on a portion of the bottom surface of the bipolar plate with a coolant flow field positioned at a position between the hydrogen flow field and the air flow field,
    wherein both sides of the fuel cell bipolar plate formed with the first plate member and the second plate member include land portions and formed to protrude toward a gas diffusion layer and channel portions and formed concavely in the opposite direction to the gas diffusion layer, the air flow field and the hydrogen flow field are formed by the channel portions and the gas diffusion layer, and the coolant flow field is formed as a space at a position between the channel portions in the vertical-up direction, and at least one chamber is formed on the vertical upper portion of the land portions where the liquid water is likely to be accumulated, while not being in communication with the coolant flow field and not preventing current collection.

* * * * *